United States Patent
Kashu et al.

(10) Patent No.: US 8,672,082 B2
(45) Date of Patent: Mar. 18, 2014

(54) CONSTRUCTION MACHINE

(75) Inventors: Taku Kashu, Kasumigaura (JP); Shohei Kamiya, Kasumigaura (JP); Hideki Haramoto, Kasumigaura (JP); Yasushi Arai, Tsuchiura (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 274 days.

(21) Appl. No.: 13/197,808

(22) Filed: Aug. 4, 2011

(65) Prior Publication Data
US 2012/0067661 A1 Mar. 22, 2012

(30) Foreign Application Priority Data
Sep. 16, 2010 (JP) ................... 2010-207850

(51) Int. Cl.
*B60K 13/04* (2006.01)
(52) U.S. Cl.
USPC ............................ 180/309; 60/274
(58) Field of Classification Search
USPC ............... 180/309; 60/272, 286, 310
See application file for complete search history.

(56) References Cited

U.S. PATENT DOCUMENTS

| | | | |
|---|---|---|---|
| 4,616,872 A | 10/1986 | Akira et al. | |
| 8,056,671 B2 * | 11/2011 | Ikegami et al. | 180/309 |
| 2009/0277156 A1 * | 11/2009 | Hodgson et al. | 60/274 |
| 2010/0038162 A1 | 2/2010 | Kamiya et al. | |
| 2012/0003071 A1 * | 1/2012 | Yoshimoto et al. | 414/719 |

FOREIGN PATENT DOCUMENTS

| | | |
|---|---|---|
| DE | 198 50 500 A1 | 5/2000 |
| JP | 61-097461 U | 6/1986 |
| JP | 2003-20936 A | 1/2003 |
| JP | 2006-57245 A | 3/2006 |
| JP | 2007-030836 A | 2/2007 |

OTHER PUBLICATIONS

Japanese Office Action received in Japanese Application No. 2010-207850 dated Jan. 22, 2013.

* cited by examiner

*Primary Examiner* — John Walters
*Assistant Examiner* — James Triggs
(74) *Attorney, Agent, or Firm* — Mattingly & Malur, PC

(57) ABSTRACT

A urea water tank (23) is arranged in a cab (10) at which an operator boards, thereby making it possible to arrange urea water under a preferred temperature environment for preventing freeze and crystallization of the urea water. A water supply port (24A) is provided to be opened to a left surface portion (19C) of a cab box (19) constituting the cab (10) for supplying the urea water to the urea water tank (23) from an outside of the cab (10). Therefore, even in a case of resupplying the urea water to the urea water tank (23), an operator can easily resupply the urea water through a water supply hose (24) to the urea water tank (23) from the outside of the cab (10) without entering into the cab (10).

8 Claims, 11 Drawing Sheets

CONSTRUCTION MACHINE

TECHNICAL FIELD

The present invention relates to a construction machine such as a hydraulic excavator mounting a NOx purifying device for removing nitrogen oxides in an exhaust gas and a urea water tank thereon.

BACKGROUND ART

Generally, a hydraulic excavator as a representative example of a construction machine is constituted by an automotive lower traveling structure, an upper revolving structure swingably mounted on the lower traveling structure, and a working mechanism liftably mounted on the front side of the upper revolving structure.

The upper revolving structure is provided with a revolving frame serving as a support structural member, an engine mounted at the rear side of the revolving frame, and a cab located at the left front side of the revolving frame to be positioned along the left side of the working mechanism.

An operator's seat is provided on a floor member as a bottom surface in the cab, and an indoor unit of an air conditioner is arranged in rear of the operator's seat. A cab box constituting a contour of the cab is provided with an inspection cover positioned on a left surface of the cab box where an operator gets on and off, wherein the inspection cover covers a filter for purifying external air aspired by the indoor unit to be capable of opening and closing (for example, Patent Document 1: Japanese Patent Laid-Open No. 2006-57245 A).

On the other hand, a diesel engine is adopted as the engine in the hydraulic excavator, and the diesel engine is supposed to discharge a large amount of nitrogen oxides (hereinafter, referred to as NOx) and the like. Therefore, a NOx purifying device for purifying NOx is known as a post-treatment device of the exhaust gas in the diesel engine. The NOx purifying device is provided in an exhaust pipe of the engine and, for example, is largely constituted by a urea selective reduction catalyst for removing NOx in the exhaust gas, a urea water tank for reserving a urea solution as a reducing agent, a urea water injection valve for injecting the urea solution in the urea water tank toward the upstream side of the urea selective reduction catalyst, and a connecting pipe connecting the urea water tank and the urea water injection valve.

The urea water to be reserved in the urea water tank is preferably arranged in a temperature environment of, for example, the range of a temperature of 4° C. to 60° C. for preventing freeze and crystallization of the urea water. Therefore, the urea water tank is arranged near an engine, a hydraulic pump, a control valve, a hydraulic motor, an operating oil tank, or the like as a heat source generating heat by an operation thereof. On the other hand, a space in which the temperature environment is stable in the hydraulic excavator is an inside of the cab as a living space of the operator, and therefore the urea water tank is arranged in the cab. (for example, Patent Document 2: Japanese Patent Laid-Open No. 2003-20936 A).

SUMMARY OF THE INVENTION

Incidentally, since the hydraulic excavator according to the Patent Document 2 mentioned above is constructed such that the urea water tank is arranged in the cab, the freeze and the crystallization of the urea water can be prevented. However, since many equipments such as an operator's seat, an operating lever for operating a working mechanism, a traveling lever for traveling a lower traveling structure, and an indoor unit of an air conditioner for supplying conditioned air and the like are arranged in the cab, a working space at the time of resupplying urea water to the urea water tank in the cab is narrow, thus requiring labor hours for the resupply operation of the urea water.

Further, since many equipments such as the operator's seat, various kinds of levers, the indoor unit and the like are arranged in the cab, it is difficult to install a large capacity of the urea water tank therein. Therefore, there is a problem that the capacity of the urea water tank is required to be small, and an operator has to resupply the urea water to the urea water tank frequently.

In view of the above-mentioned problems with the conventional art, it is an object of the present invention to provide a construction machine which can easily resupply urea water to a urea water tank in a cab from an outside even in a case where the urea water tank is arranged in the cab.

(1) A construction machine according to the present invention comprises a support frame forming a support structural member for a traveling structure, an engine mounted at the rear side of the support frame, a cab which is positioned at the front side of the support frame and comprises a floor surface, side surface portions in the front and rear directions and in the right and left directions and a top surface portion, and in which an operator's seat on which an operator sits is arranged on the floor surface, a NOx purifying device provided in an exhaust pipe of the engine and equipped with a urea selective reduction catalyst for removing nitrogen oxides in an exhaust gas, a urea water tank formed of a hollow container for reserving urea water as a reducing agent and including a water supply port for supplying the urea water, and a connecting pipe connecting the urea water tank and the exhaust pipe of the engine.

To overcome the above-mentioned problems, the construction which the present invention adopts is characterized in that the urea water tank is arranged in the cab which is in a preferred temperature environment for preventing freeze and crystallization of the urea water, and the water supply port is provided to be opened to one side surface portion of the side surface portions of the cab for supplying the urea water to the urea water tank from an outside of the cab.

With this arrangement just described, since the urea water tank is arranged in the cab, the urea water can be arranged in the preferred temperature environment to prevent freeze and crystallization of the urea water. Further, since the water supply port is provided to be opened to the one side surface portion of the cab for supplying the urea water to the urea water tank from an outside of the cab, an operator can easily resupply the urea water through the water supply port to the urea water tank from the outside of the cab without entering into the cab. As a result, it is possible to facilitate the water supply operation of the urea water to the urea water tank to improve the operability.

(2) According to the present invention, a water supply hose is provided to be connected to the urea water tank, and the water supply port is provided in a front end of the water supply hose and is opened to the one side surface portion of the cab. As a consequence, the urea water to be resupplied from the water supply port can be supplied through the water supply hose to the urea water tank in the cab.

(3) According to the present invention, the water supply port is opened, among the respective side surface portions forming the cab, to an outside surface portion thereof provided with a door opening/closing at the time an operator gets on and off the cab and to the rear side of the door, and an opening/closing cover for covering the water supply port to be capable of opening/closing is provided in the outside surface portion.

With this arrangement, since the water supply port is opened to the outside surface portion provided with the door opening/closing at the time the operator gets on and off the cab, the operator can easily reach a water supply position of the urea water with a simple action similar to the getting-on/off action to the cab, thus easily and certainly performing the water supply operation of the urea water. Since the opening/closing cover for covering the water supply port to be capable of opening/closing is provided in the outside surface portion of the cab, the water supply port can be concealed except for the water supply operation time to improve an external appearance. Further, in a case of locking the opening/closing cover, the water supply port can be protected from mischief.

(4) According to the present invention, an indoor unit of an air conditioner for supplying conditioned air is provided on the floor surface of the cab, an external air filter through which the indoor unit takes in external air is provided on the outside surface portion to be positioned in the vicinity to the water supply port, and the opening/closing cover covers the water supply port and the external air filter together. In this case, the water supply port and the external air filter arranged in the vicinity to each other can be concealed by one opening/closing cover.

(5) According to the present invention, a tank accommodating recessed portion is provided on the floor surface of the cab by recessing the floor surface downwards, and the urea water tank is accommodated in the tank accommodating recessed portion.

With this arrangement, the urea water tank can increase the capacity by using the space in a position lower than the floor surface. As a result, since the urea water tank can reserve a great deal of the urea water by one time of the water supply operation, the number of times of the resupply operations of the urea water can be reduced to improve the operability. The urea water tank can be protected from outside cooled air and heated air by accommodating the urea water tank within the tank accommodating recessed portion, thus positioning the urea water tank under the appropriate temperature environment.

(6) According to the present invention, an indoor unit of an air conditioner for supplying conditioned air is provided on the floor surface of the cab to be positioned in rear side of the operator's seat and the urea water tank arranges at least apart of the container between the operator's seat and the indoor unit. As a consequence, the urea water tank can be arranged by using the space between the operator's seat and the indoor unit, thus increasing the tank capacity.

(7) In the case of the above (6), according to the present invention, the tank accommodating recessed portion is provided on the floor surface of the cab to be positioned between the operator's seat and the indoor unit by recessing the floor surface downwards, and the urea water tank accommodates at least a part of the container within the tank accommodating recessed portion.

In this case, the capacity of the urea water tank can be increased by using a dead space in a position lower than the floor surface of the cab. As a result, since a great deal of the urea water can be reserved in the urea water tank by one time of the water supply operation, the number of times of the resupply operations of the urea water can be reduced to improve the operability. Further, by accommodating the urea water tank within the tank accommodating recessed portion, the urea water tank can be protected from outside cooled air and heated air, thus positioning the urea water tank under the appropriate temperature environment.

(8) According to the present invention, the urea water tank is formed as a stepped tank including a lower tank portion positioned in the front side and having a low height dimension and a higher tank portion positioned in the rear side and having a high height dimension, wherein the lower tank portion is arranged under the operator's seat and the higher tank portion is arranged in rear of the operator's seat.

With this arrangement, since the urea water tank is formed as the stepped tank by the lower tank portion in the front side and the higher tank portion in the rear side, the lower tank portion can be arranged under the operator's seat and the higher tank portion can be in rear of the operator's seat. Therefore, the capacity of the urea water tank can be furthermore increased by using the spaces under the operator's seat, under the floor surface and in rear of the operator's seat.

(9) The present invention may be constructed such that the traveling structure comprises an automotive lower traveling structure and an upper revolving structure swingably mounted on the lower traveling structure, and the support frame is a revolving frame of the upper revolving structure. In this case, the present invention is preferably applied to a revolving type working mechanism such as a hydraulic excavator and a hydraulic crane.

BRIEF DESCRIPTION OF THE DRAWINGS

In the accompanying drawings:

FIG. 3 is a construction diagram showing the construction of a post-treatment device together with an engine and the like;

FIG. 8 is an external perspective view showing in enlarged form a urea water tank in FIG. 7 and the like;

MODE FOR CARRYING OUT THE INVENTION

Hereinafter, construction machines according to embodiments in the present invention will be explained in detail with reference to the accompanying drawings, by taking a crawler type hydraulic excavator as an example.

FIG. 1 to FIG. 8 show a first embodiment in the present invention. In the first embodiment, the case is illustrated in which a urea water tank is arranged under an operator's seat and a half of the bottom side in the urea water tank is arranged in a position lower than a floor surface plate.

Figure 1:
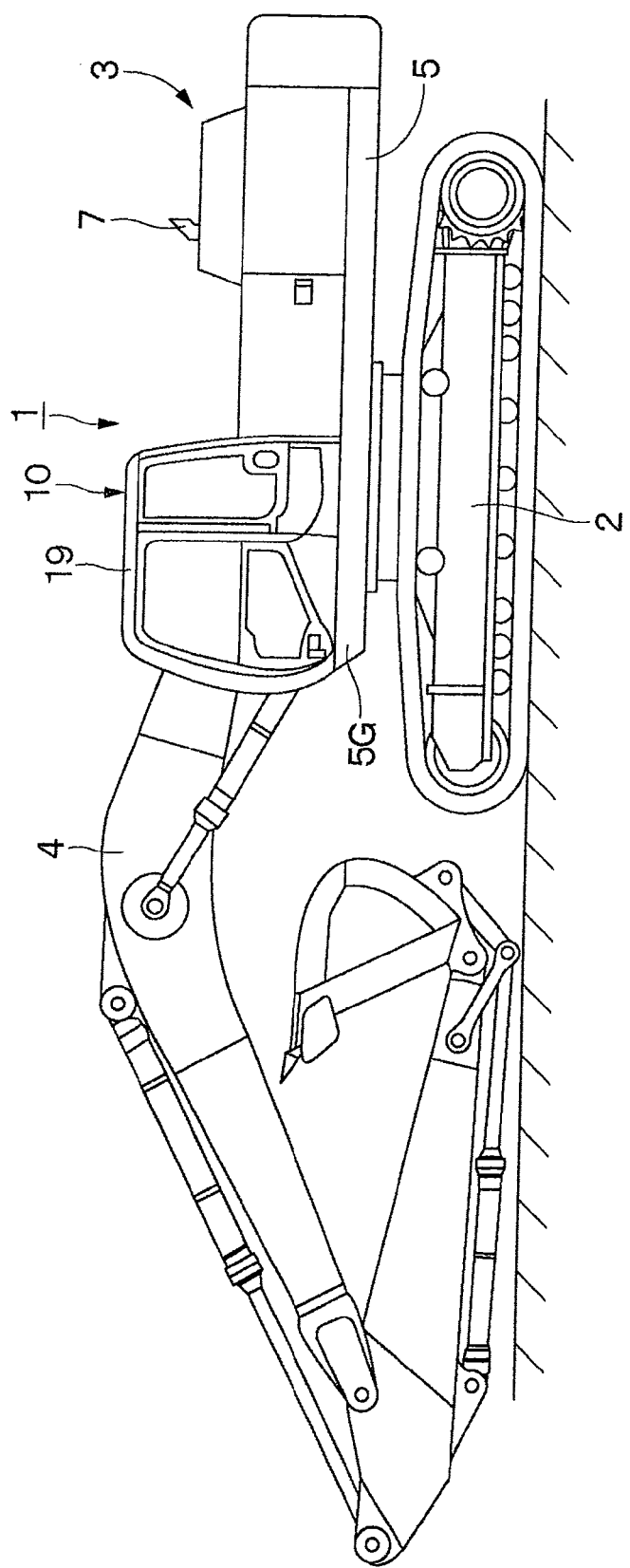
FIG. 1 is a front view showing a hydraulic excavator which is applied to a first embodiment of the present invention.

In FIG. 1, designated at 1 is a hydraulic excavator known as a construction machine used in an excavating operation of earth and sand and the like. The hydraulic excavator 1 is largely constituted by an automotive crawler type lower traveling structure 2, an upper revolving structure 3 which is swingably mounted on the lower traveling structure 2 and constitutes a traveling structure together with the lower traveling structure 2, and a working mechanism 4 provided liftably on the front side of the upper revolving structure 3.

The upper revolving structure 3 is largely constituted by a revolving frame 5, an engine 6, a cab 10, a post-treatment device 20, a urea water tank 23, and the like, which will be described hereinafter.

Figure 2:
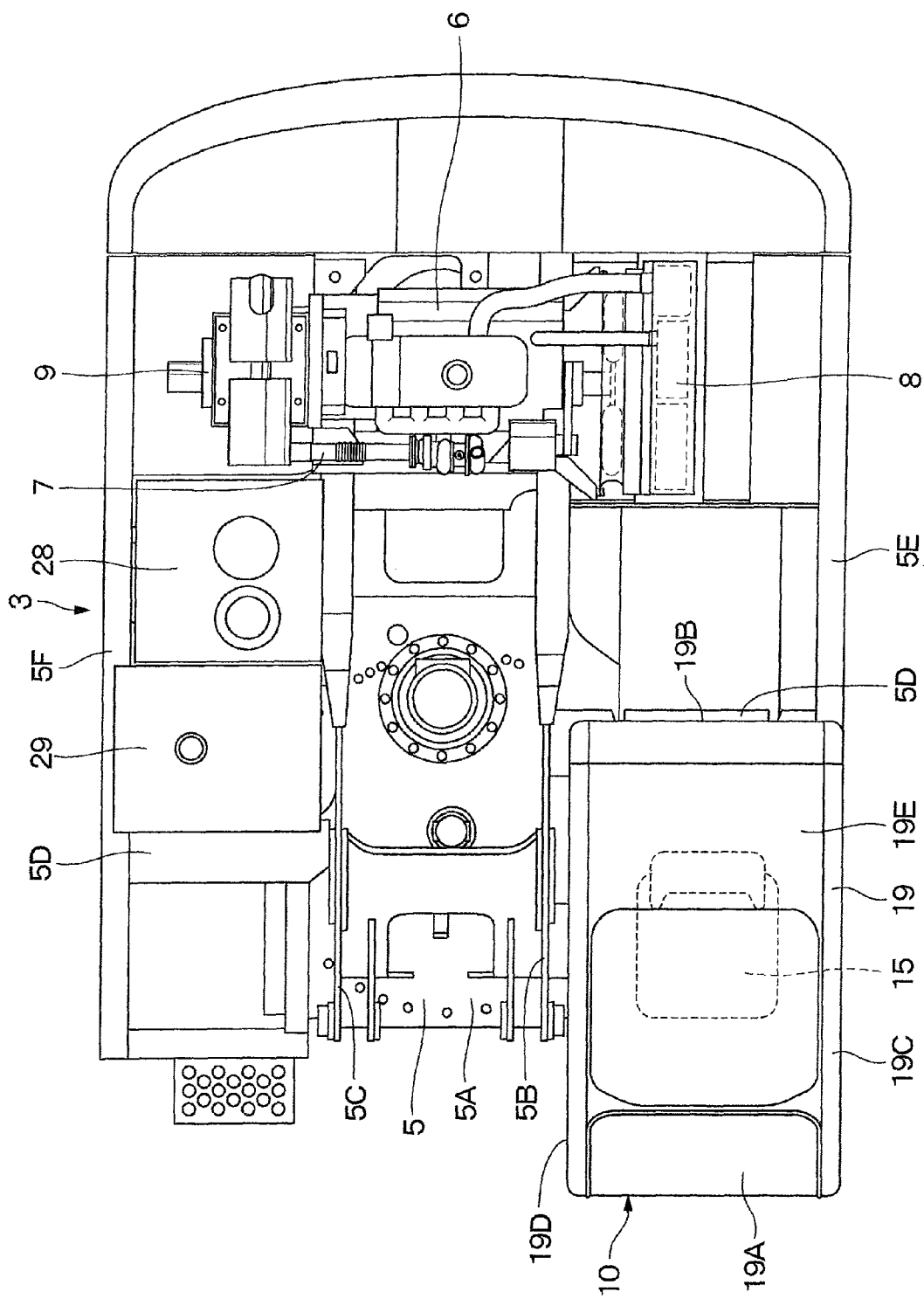
FIG. 2 is a plan view showing an upper revolving structure with a housing cover and the like being removed.

Denoted at 5 is the revolving frame as a support frame, and the revolving frame 5 serves as a strong support structural member. As shown in FIG. 2, the revolving frame 5 is constituted by a thick bottom plate 5A extending in the front and rear directions, left and right vertical plates 5B and 5C provided upright on the bottom plate 5A and extending in the front and rear directions to be spaced by a predetermined interval in the right and left directions, a plurality of extension beams 5D extending outwardly in the right and left directions from the respective vertical plates 5B and 5C, a left side frame 5E and a right side frame 5F mounted at distal ends of the respective extension beams 5D to be positioned in the outside in the right and left directions and extending in the front and rear directions, and a cab support portion 5G (see FIG. 1) positioned in the left front side for supporting the cab 10 to be described later.

Indicated at 6 is the engine provided at the rear side of the revolving frame 5, and the engine 6 is constructed as a diesel engine and mounted on the revolving frame 5 in a horizontal state. The engine 6 is provided with an exhaust pipe 7 for discharging an exhaust gas.

Here, the diesel engine 6 achieves a high efficiency and is advantageous in durability, and on the other hand, has a defect that harmful substances such as particulate matter (PM) and nitrogen oxides (NOx) are discharged together with the exhaust gas. Therefore, as described later, the post-treatment device 20 mounted in the exhaust pipe 7 is provided with a PM trapping device 21 for removing the particulate matter, and a NOx purifying device 22 for removing the nitrogen oxides (NOx). The PM trapping device 21 and the NOx purifying device 22 are connected by a connecting pipe portion 7A in the exhaust pipe 7.

Indicated at 8 is a heat exchanger provided at the left side of the engine 6 (see FIG. 2), and the heat exchanger 8 is constituted by a radiator for cooling engine cooling water, an oil cooler for cooling operating oil, an intercooler for cooling air to be suctioned into the engine 6, and the like. Indicated at 9 is a hydraulic pump mounted to the right side of the engine 6, and the hydraulic pump 9 is driven by the engine 6 to discharge the operating oil from an operating oil tank 28 as pressurized oil.

Indicated at 10 is the cab provided in the left front side of the revolving frame 5. An operator boards at the cab 10 for operating the hydraulic excavator 1. The cab 10 is constituted by a floor member 11, a tank accommodating recessed portion 13, a seat support platform 14, an operator's seat 15, an operating lever 16, a traveling lever 17, an indoor unit 18 of an air conditioner, and a cab box 19, which will be described later, and the like.

Figure 6:
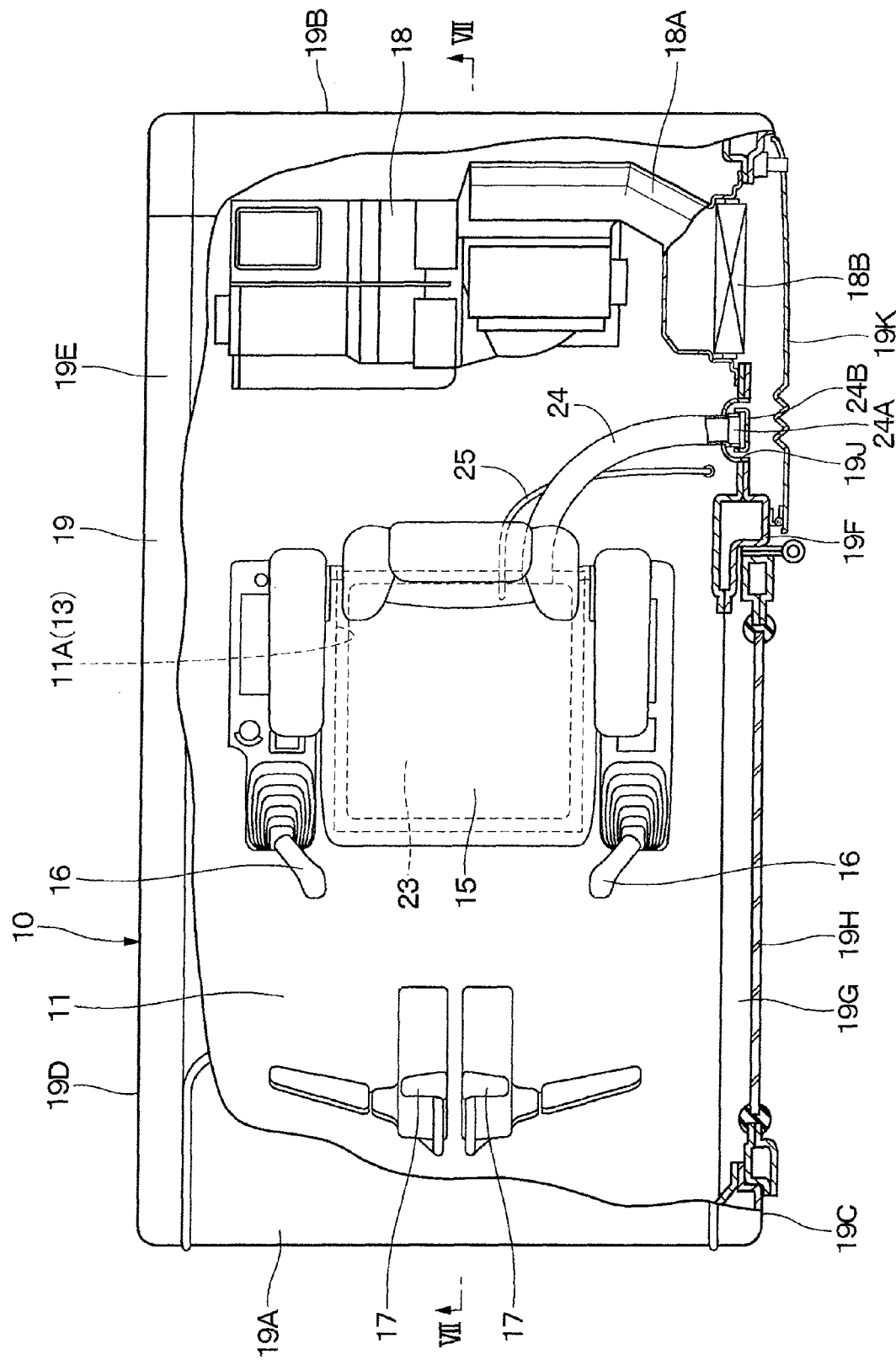
FIG. 6 is a cross-sectional view showing in enlarged form an internal structure of the cab.
Figure 7:
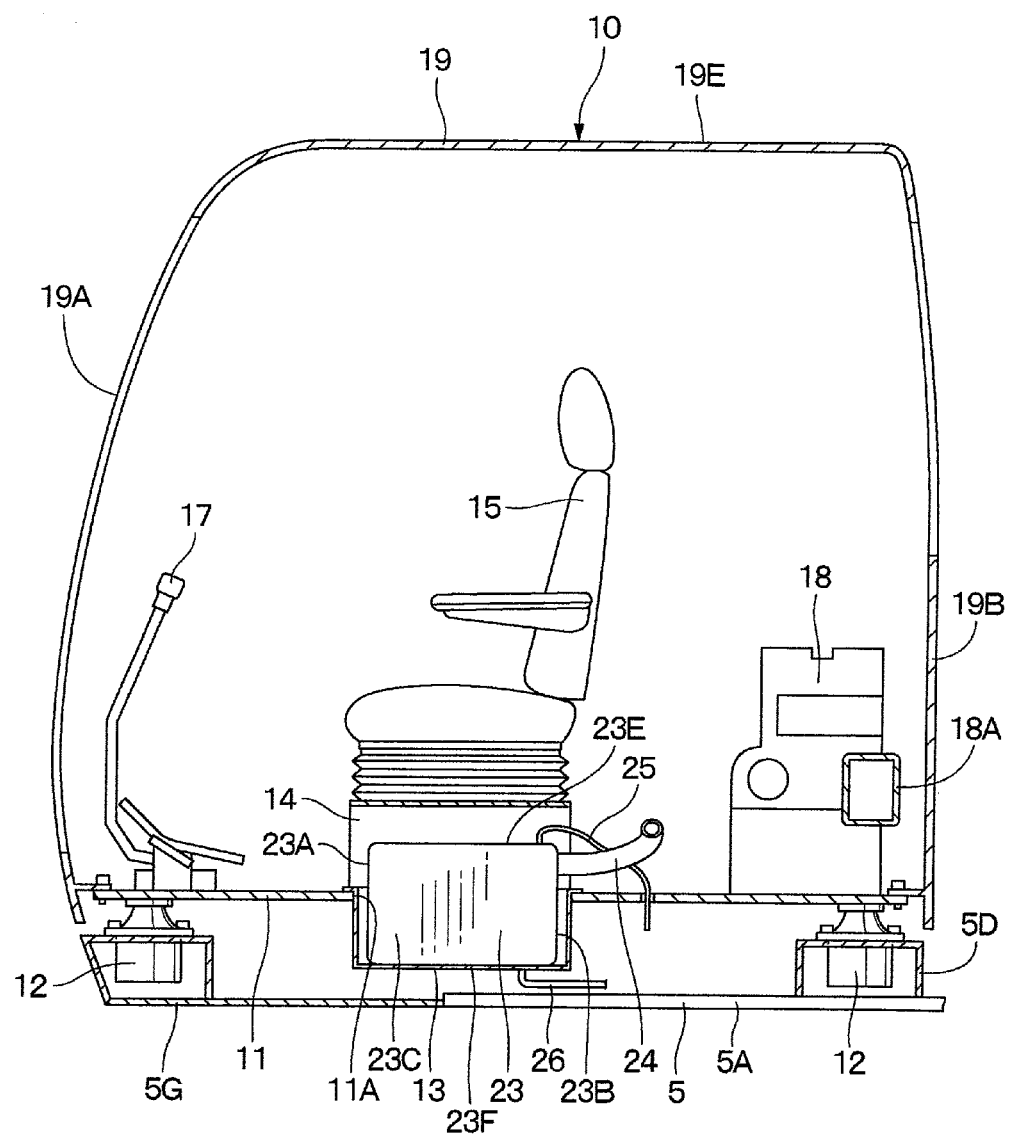
FIG. 7 is a longitudinal sectional view showing the internal structure of the cab, taken in the direction of the arrows VII-VII of FIG. 6.

Indicated at 11 is the floor member constituting a bottom surface of the cab 10, and, as shown in FIG. 6 and in FIG. 7, the floor member 11 is formed as a rectangular plate longer in the front and rear directions. The four corners of the floor member 11 are supported through vibration isolating mounts 12 (two mounts only in the left side are shown in FIG. 7) by the extension beam 5D of the revolving frame 5 and the cab support portion 5G. Therefore, vibrations transmitted to the urea water tank 23 to be described later provided in the floor member 11 from the revolving frame 5 can be alleviated and the strength of the urea water tank can be set lower.

On the other hand, a square-shaped opening portion 11A is formed in the floor member 11 in the intermediate position in the front and rear directions and under the seat support platform 14. The tank accommodating recessed portion 13 to be described later is provided in the opening portion 11A of the floor member 11.

Denoted at 13 is the tank accommodating recessed portion provided in the opening portion 11A of the floor member 11. The tank accommodating recessed portion 13 is formed to recess the intermediate portion of the floor member 11 in the front and rear directions and in the right and left directions, that is, the position of the opening portion 11A downwards. The tank accommodating recessed portion 13 is formed as a rectangular box an upper side of which is opened, and the circumference of the opened side (upper side) is mounted to the opening portion 11A of the floor member 11. Further, a dimension of the tank accommodating recessed portion 13 in the upper and lower directions (depth dimension) is, even in a case where the cab 10 swings largely on the revolving frame 5, set to the extent that the bottom side of the tank accommodating recessed portion 13, a urea water supply pipe 26 to be described later, and the like do not interfere with the floor plate 5A and an undercover (not shown).

Here, the tank accommodating recessed portion 13 is sized to be accommodated substantially within the dimension in the front and rear directions and within the dimension in the right and left directions of the seat support platform 14. Therefore, the urea water tank 23 to be described later can be accommodated in the tank accommodating recessed portion 13 by using the dead space under the operator's seat 15 and in a state where the capacity is increased toward the lower side. In addition, the tank accommodating recessed portion 13 can be placed in the room of the cab 10 where an entire urea water tank 23 is not in touch with outside cooled air or heated air, that is, under the room environment a temperature of which is controlled by the air conditioner by covering the bottom side of the urea water tank 23.

Indicated at 14 is the seat support platform provided in the floor member 11 at the intermediate position in the front and rear directions, and the seat support platform 14 supports the operator's seat 15 to be described later. The seat support platform 14 is formed in a gate shape in such a manner as to cross over the opening portion 11A in the right and left directions. Therefore, a space for accommodating the top side portion of the urea water tank 23 can be formed in the seat support platform 14 to be positioned above the tank accommodating recessed portion 13.

Indicated at 15 is the operator's seat provided on the seat support platform 14, and an operator sits on the operator's seat 15. As shown in FIG. 6, the right and left operating levers 16 for operating the working mechanism 4 and the like are provided in both of the right and left sides of the operator's seat 15.

On the other hand, the right and left traveling levers (pedals) 17 for traveling the lower traveling structure 2 are arranged in a front part of the floor member 11 in front of the operator's seat 15.

Indicated at 18 is the indoor unit of the air conditioner provided in the cab 10. The indoor unit 18 houses a blower fan, an evaporator, a heater core (any of them not shown) and the like therein, and is connected to outdoor units (a capacitor, a compressor and the like) provided in a side of the engine 6. The indoor unit 18 blows out cool air or warm air adjusted to a desired temperature as the conditioned air into the cab 10 to control the inside of the cab 10 to the temperature environment which an operator favors.

In a case of the present embodiment, the indoor unit 18 is arranged in a rear portion of the floor member 11 spaced backward from the operator's seat 15. An external air duct 18A for taking in external air is provided in the left side of the indoor unit 18 and the external air duct 18A is connected to a rear lower side of a left surface portion 19C of the cab box 19 to be described later. Further, a left portion of the external air duct 18A constitutes an opening portion opened to the outside, and is provided with an external air filter 18B trapping dusts and the like so as to close the opening portion. Among the left surface portion 19C of the cab box 19, a portion on which the external air filter 18B is provided can be concealed together with the water supply port 24A of urea water by the opening/closing cover 19K to be described later.

Figure 4:
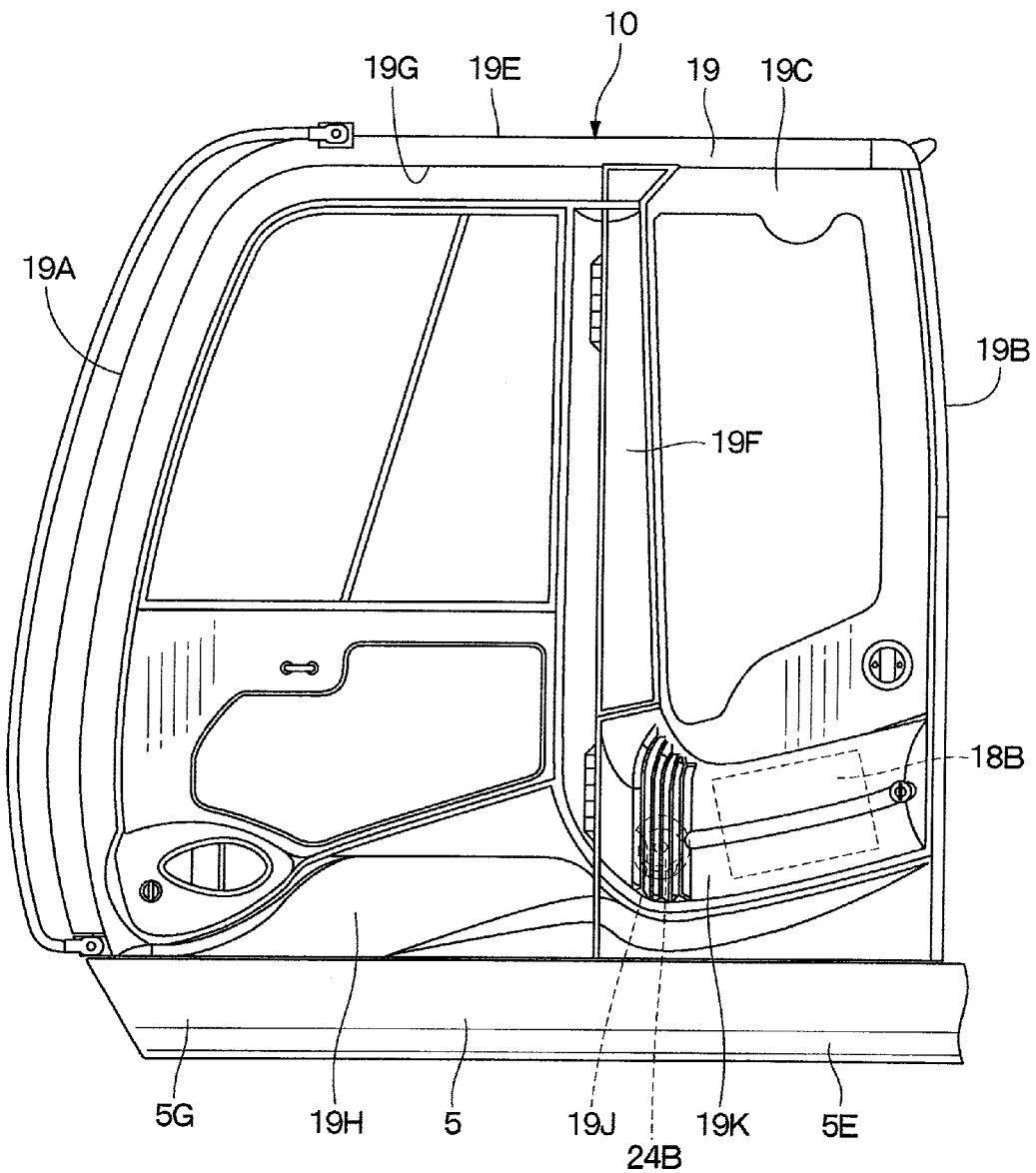
FIG. 4 is front view showing in enlarged form a cab in FIG. 1 together with a part of a revolving frame.

Indicated at 19 is the cab box provided on the floor member 11, and the cab box 19 defines an operating room on the floor member 11. As shown in FIG. 4, FIG. 6, FIG. 7 and the like, the cab box 19 is formed in a boxy shape by a front surface portion 19A, a rear surface portion 19B, a left surface portion 19C, a right surface portion 19D, and a top surface portion 19E. Lower portions of four side surfaces composed of the front surface portion 19A, the rear surface portion 19B, the left surface portion 19C, and the right surface portion 19D are mounted to the circumference of the floor member 11.

A center pillar 19F extending in the upper and lower directions is provided in the left surface portion 19C positioned in the outside in the right and left directions to be positioned in the intermediate portion in the front and rear directions. As shown in FIG. 6, an entrance way 19G as a space for an operator to go out or come in is provided to be positioned forward of the center pillar 19F. The entrance way 19G can be opened/closed by a door 19H rotatably mounted on the center pillar 19F.

On the other hand, the external air duct 18A of the indoor unit 18 is mounted in the rear position of the left surface portion 19C positioned rear side of the door 19H. A water supply port opening portion 19J is provided in a position close to the mount portion of the external air duct 18A and between a mounting portion of the external air duct 18A and the center pillar 19F for opening a water supply port 24A of a water supply hose 24 to be described later. Since the water supply port 24A of the urea water is opened to the left surface portion 19C of the cab box 19 where an operator gets on/off, the operator can reach the water supply position of the urea water with a simple action similar to the getting-on/off operation to the cab 10, thus performing the water supply operation of the urea water easily and certainly.

Further, in case the mount portion (external air filter 18B) of the external air duct 18A and the water supply port opening portion 19J are exposed to an outside, the external appearance is not so good. Therefore, the opening/closing cover 19K which can conceal the external air filter 18B of the external air duct 18A and the water supply port opening portion 19J together and open them at a time of maintenance operation or water supply operation is provided on the left surface portion 19C. The opening/closing cover 19K is swingably mounted on, for example, the center pillar 19F and is adapted to be capable of being locked for preventing mischief.

Next, the construction of the post-treatment device 20 equipped with the NOx purifying device 22 and the like as the characterizing portion in the present embodiment will be explained.

Denoted at 20 is the post-treatment device provided to be connected to the exhaust pipe 7 in the engine 6. The post-treatment device 20 is provided with the PM trapping device 21 to be described later for trapping and removing particulate matter (PM: Particulate Matter) in an exhaust gas and the NOx purifying device 22 to be described later for purifying nitrogen oxides (NOx) in the exhaust gas by using a urea solution as a reducing agent. The post-treatment device 20 is largely constituted by the PM trapping device 21 and the NOx purifying device 22.

Indicated at 21 is the PM trapping device (particulate matter removing device) provided to be connected to the outlet side of the exhaust pipe 7 in the engine 6. The PM trapping device 21 serves to trap and remove particulate matter (PM) contained in an exhaust gas. The PM trapping device 21 is formed as a hollow tubular casing extending in the front and rear directions and is largely constituted by an accommodating tubular casing 21A having an upstream side (front side) connected to the exhaust pipe 7 in the engine 6, a PM trapping filter 21B accommodated in the accommodating tubular casing 21A, and an oxidation catalyst 21C arranged upstream of the PM trapping filter 21B.

The PM trapping device 21 oxides carbon monoxides (CO), hydrocarbon (HC), and the like contained in the exhaust gas for removal and removes nitrogen oxides (NO) as nitrogen dioxides ($NO_2$) by the oxidation catalyst 21C. Further, the PM trapping filter 21B traps particulate matter contained in the exhaust gas and burns the trapped particulate matter for removal.

Indicated at 22 is the NOx purifying device provided to be connected to the downstream side of the PM trapping device 21. The NOx purifying device 22 serves to purify nitrogen oxides (NOx) in the exhaust gas by using the urea solution. The NOx purifying device 22 is formed as a hollow tubular casing extending in the front and rear directions and is largely constituted by the accommodating tubular casing 22A connected to the downstream side (rear side) of the PM trapping device 21 through the connecting pipe portion 7A in the exhaust pipe 7, a urea selective reduction catalyst 22B accommodated in the upstream side of the accommodating tubular casing 22A, an oxidation catalyst 22C arranged downstream of the urea selective reduction catalyst 22B, and a urea water injection valve 22D provided upstream of the urea selective reduction catalyst 22B, for example, in the connecting pipe portion 7A in the exhaust pipe 7. The urea water injection valve 22D is connected to the urea water tank 23 through a urea water supply pipe 26 and a supply pump 27 to be described later.

The NOx purifying device 22 injects a urea solution into the exhaust gas by the urea water injection valve 22D, and reduces NOx in the exhaust gas by using ammonia generated from the urea solution by the urea selective reduction catalyst 22B to water and nitrogen. The NOx purifying device 22 removes the ammonia in the exhaust gas by the oxidation catalyst 22C.

Next, the urea water tank 23 according to the first embodiment provided in the cab 10 away from the engine 6 will be described with reference to FIG. 3 to FIG. 8.

Figure 3:
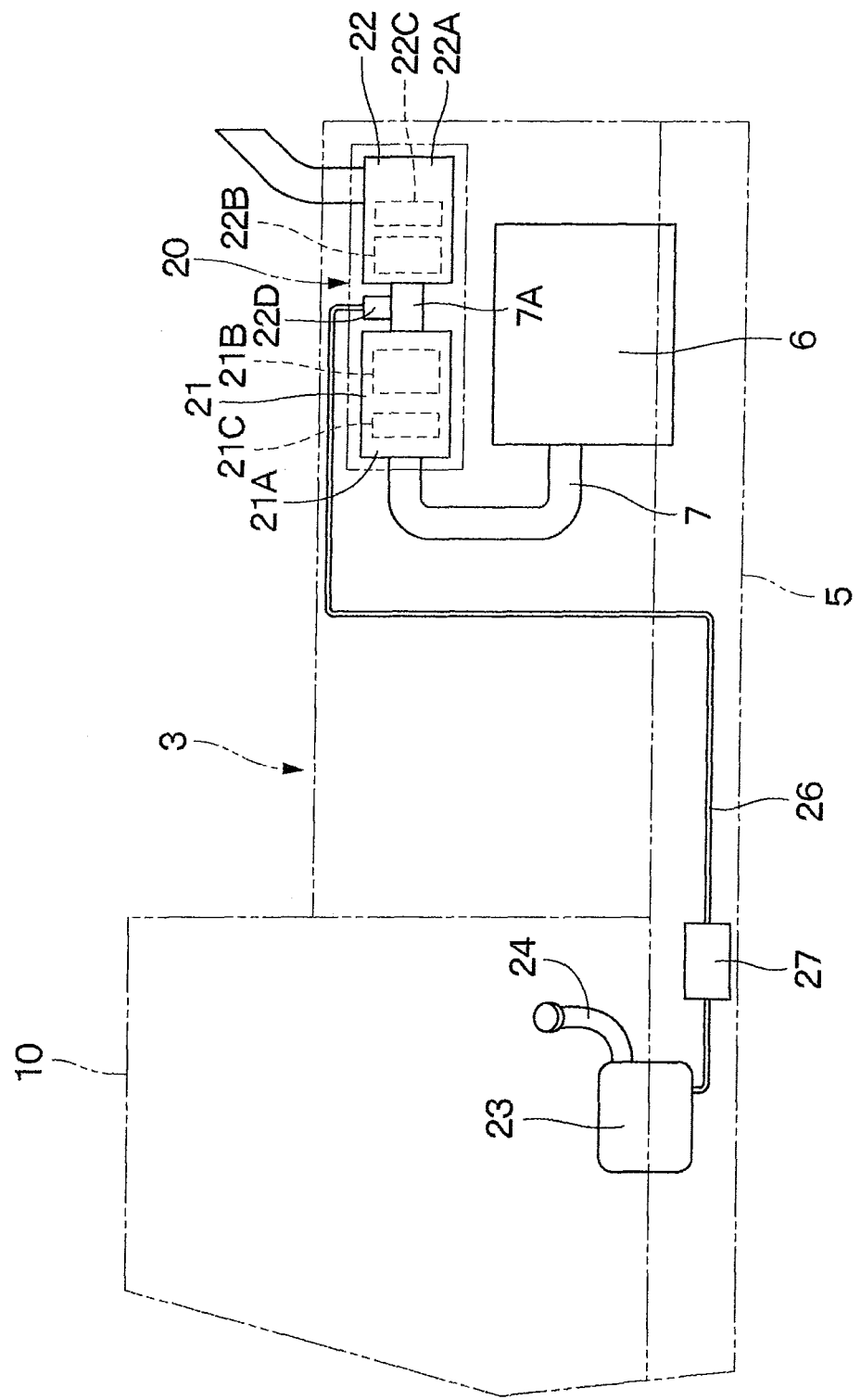

In FIG. 3, denoted at 23 is the urea water tank constituting the NOx purifying device 22, and the urea water tank 23 reserves the urea solution to be injected upstream of the urea selective reduction catalyst 22B. The urea water tank 23 is arranged in the cab 10 whereby the urea water tank 23 is placed in a preferred temperature environment for preventing freeze or crystallization of the urea water, for example, in a range of 4° C. to 60° C. Further, the urea water tank 23 is formed as a multifaceted type container composed of many side surfaces and is connected to the urea water injection valve 22D through the urea water supply pipe 26 and the supply pump 27 to be described later.

Figure 8:
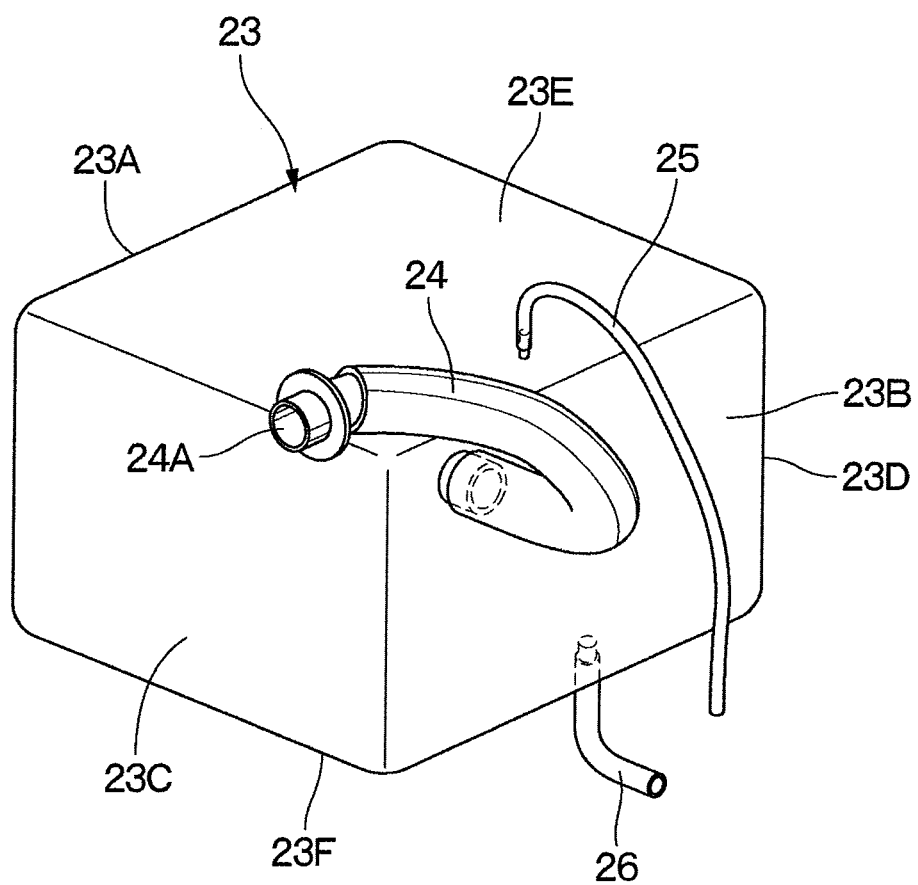

Namely, as shown in FIG. 8 and the like, the urea water tank 23 is formed as a hexahedral liquid-tight container by a front surface 23A, a rear surface 23B, a left surface 23C, a right surface 23D, a top surface 23E, and a bottom surface 23F.

Indicated at 24 is, for example, a water supply hose provided in a top portion of the rear surface 23B in the urea water tank 23, and the water supply hose 24 extends obliquely upwards. A front end side of the water supply hose 24 is formed as a water supply port 24A and is mounted in a state of being opened to a position of the water supply port opening portion 19J of the left surface portion 19C constituting the cab box 19. A cap 24B is removably mounted in the water supply port 24A. Therefore, at a water supply time of the urea water, an operator can reach the water supply position of the urea water in the route when the operator gets on and off the cab 10, that is, the front side of the water supply port 24A. As a result, the operator can have easy access to the water supply port 24A from an outside by removing the cap 24B to simply resupply the urea water to the urea water tank 23 through the water supply hose 24.

An air open hose 25 is connected to the top surface 23E of the urea water tank 23 for allowing variations in internal pressures due to a change in a liquid surface or a change in a temperature, for example, and a front end of the air open hose 25 penetrates, for example, the floor member 11 and extends externally. On the other hand, the urea water supply pipe 26 to be described later is connected to the bottom surface 23F of the urea water tank 23.

As shown in FIG. 7, in the urea water tank 23 according to the first embodiment formed in a rectangular shape, the intermediate portion and the bottom side portion in the upper and lower directions are accommodated in the tank accommodating recessed portion 13 from the opening portion 11A of the floor member 11. On the other hand, the top side portion of the urea water tank 23 extending from the tank accommodating recessed portion 13 to the top side is accommodated in the seat support platform 14.

With this construction, the urea water tank 23 can be arranged in a position in the cab 10 in such a manner that it does not form an obstacle to movement of an operator therein and further, an accommodating capacity of the urea water can be increased by using a space under the floor in a position lower than the floor member 11. In addition, the top side portion in the urea water tank 23 also can be increased in height by using a space in the seat support platform 14, thus furthermore increasing the capacity of the urea water tank 23.

Indicated at 26 is the urea water supply pipe as a connecting pipe provided for connection of the urea water tank 23 and the urea water injection valve 22D. The supply pump 27 is provided in the halfway of the urea water supply pipe 26. Therefore, the urea water in the urea water tank 23 can be supplied to the urea water injection valve 22D in a pressurized state through the urea water supply pipe 26.

It should be noted that indicated at 28 is the operating oil tank positioned in front of the hydraulic pump 9 and mounted in the right side of the revolving frame 5. The operating oil tank 28 reserves operating oil to be supplied to the hydraulic pump 9. In addition, indicated at 29 is the fuel tank provided in front of the operating oil tank 28, and the fuel tank 29 reserves therein fuel to be supplied to the engine 6.

The hydraulic excavator 1 according to the first embodiment has the aforementioned construction, and next, an operation thereof will be explained.

An operator boards at the cab 10 and starts the engine 6 to drive the hydraulic pump 9. By operating the traveling lever 17, the lower traveling structure 2 can be forwarded or retreated. On the other hand, by operating the operating lever 16, the working mechanism 4 can be tilted to perform an excavating operation of earth and sand and the like.

At an operating time of the engine 6, particulate matter (PM), nitrogen oxides (NOx) and the like as harmful substances are discharged from the exhaust pipe 7. Therefore, the PM trapping device 21 removes the particulate matter. Next, the NOx purifying device 22 removes the nitrogen oxides. Namely, for removing the nitrogen oxides by the NOx purifying device 22, the urea solution in the urea water tank 23 is supplied to the urea water injection valve 22D of the NOx purifying device 22 from the urea water supply pipe 26 by using the supply pump 27. The NOx purifying device 22 injects the urea solution into the exhaust gas from the urea water injection valve 22D to generate ammonia. Therefore, the urea selective reduction catalyst 22B reduces the nitrogen oxides to water and nitrogen, and the oxidation catalyst 22C removes the ammonia in the exhaust gas. Thereafter, the purified exhaust gas is discharged to an outside, thus making it possible to reduce a discharge amount of the nitrogen oxides.

On the other hand, for example, at a working site such as cold districts where an external air temperature reaches a temperature of less than −10° C. or tropical regions where the external air temperature reaches a temperature of more than 50° C., there is a possibility that the urea solution in the urea water tank 23 is frozen or crystallized, and in this case, the NOx purifying device 22 cannot purify an exhaust gas. However, since the urea water tank 23 is arranged in the cab 10 which is under a preferred temperature environment for preventing freeze or crystallization of the urea water, the urea solution in the urea water tank 23 can be maintained at an appropriate temperature.

Figure 5:
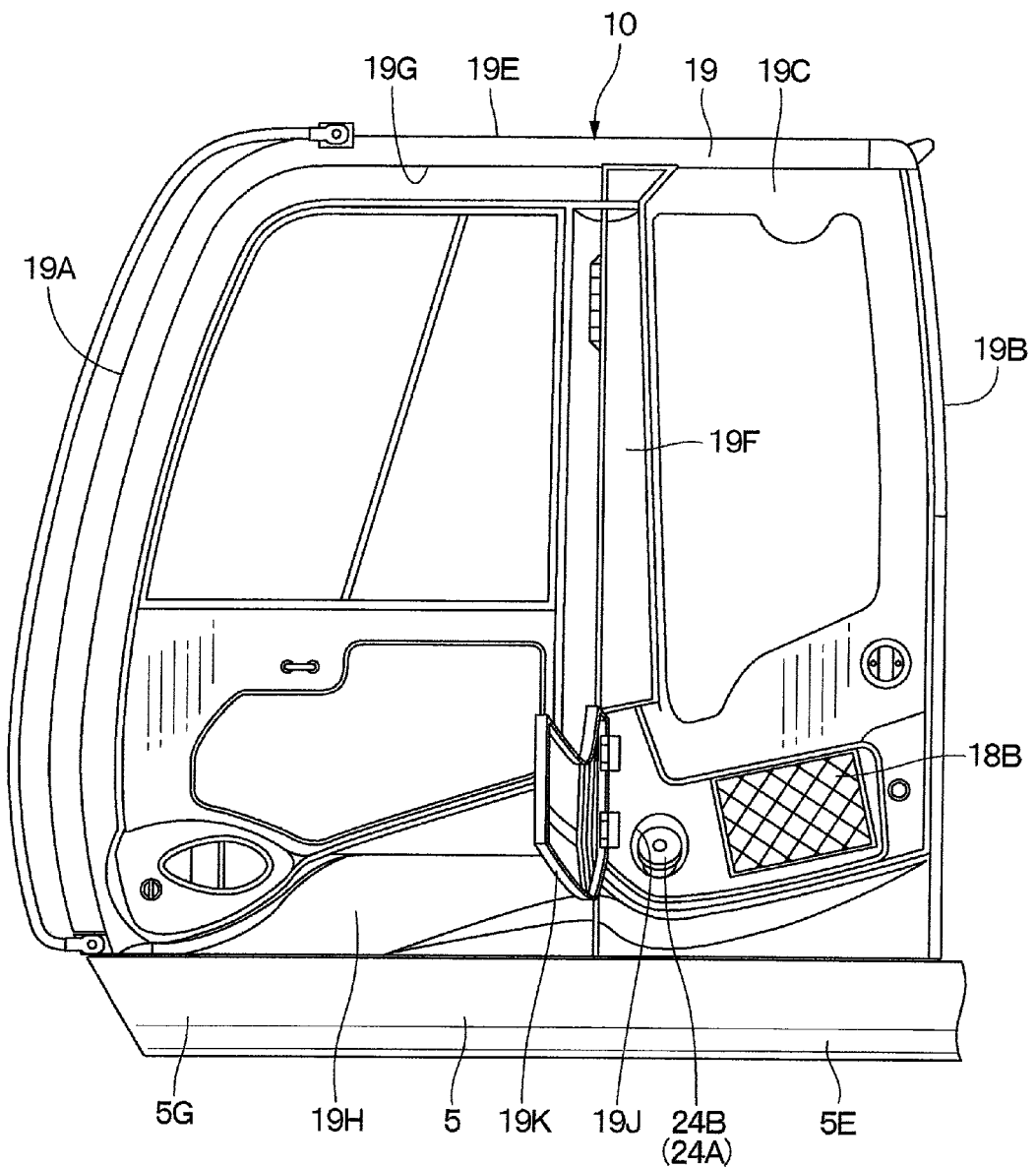
FIG. 5 is a front view showing the cab in FIG. 4 in a state where an external air filter of an air conditioner and a water supply port of a urea water tank are exposed by opening an opening/closing cover.

Further, as shown in FIG. 5, in a case of resupplying the urea water to the urea water tank 23, an operator opens the opening/closing cover 19K of the cab box 19 and removes the cap 24B of the water supply hose 24. As a result, the operator can have easy access to the water supply port 24A from an outside to easily resupply the urea water to the urea water tank 23 through the water supply hose 24.

In this manner, according to the first embodiment, since the urea water tank 23 is arranged in the cab 10 where the operator boards, the urea water tank 23 can be arranged under a preferred temperature environment for preventing the freeze or crystallization of the urea water. Further, the water supply port 24A for supplying the urea water to the urea water tank 23 from the outside of the cab 10 is provided to be opened to the left surface portion 19C of the cab box 19 constituting the cab 10.

Therefore, even in a case of resupplying the urea water to the urea water tank 23, the operator can easily resupply the urea water to the urea water tank 23 through the water supply hose 24 from the outside of the wide cab 10 without entering into the cab 10.

As a result, the freeze or crystallization of the urea water in the urea water tank 23 can be prevented to improve the reliability. Further, the water supply operation of the urea water to the urea water tank 23 can be easily performed by an operator to improve the operability.

In addition, the tank accommodating recessed portion 13 is provided in the floor member 11 of the cab 10 to be recessed downwards, and the portion in the urea water tank 13 from the intermediate portion to the lower side portion thereof is accommodated in the tank accommodating recessed portion 13. Accordingly, the urea water tank 23 can increase the capacity by using the dead space in a position lower than the floor member 11.

As a result, since a great deal of the urea water can be reserved in the urea water tank 23 by one time of the urea water supply operation, the number of times of operations of resupplying the urea water can be reduced to improve the operability. Besides, since the urea water tank 23 is accommodated in the tank accommodating recessed portion 13, the urea water tank 23 can be protected from the outside cooled air or heated air to place the urea water tank 23 under the appropriate temperature environment.

On the other hand, the water supply port 24A of the water supply hose 24 connected to the urea water tank 23 is provided in the left surface portion 19C of the cab box 19 where the operator gets on/off. Therefore, the operator can reach the water supply position of the urea water by a simple operation similar to the entrance action on the cab 10 and can easily and certainly perform the water supply operation of the urea water.

Further, since the opening/closing cover 19K is provided in the left surface portion 19C of the cab box 19 in a position of concealing the water supply port 24A of the water supply hose 24, an external appearance can be improved. Further, since the opening/closing cover 19K can be locked, the cap 24B and the like can be protected from mischief.

Furthermore, since the water supply port 24A of the water supply hose 24 and the external air filter 18B of the indoor unit 18 are arranged in close vicinity to each other and the opening/closing cover 19K of the cab box 19 conceals the water supply port 24A and the external air filter 18B together, one opening/closing cover 19K can conceal both of the water supply port 24A and the external air filter 18B. Therefore, when the opening/closing cover 19K is opened, a necessary operation out of the water supply operation of the urea water from the water supply port 24A and the maintenance operation of the external air filter 18B can be performed.

Figure 9:
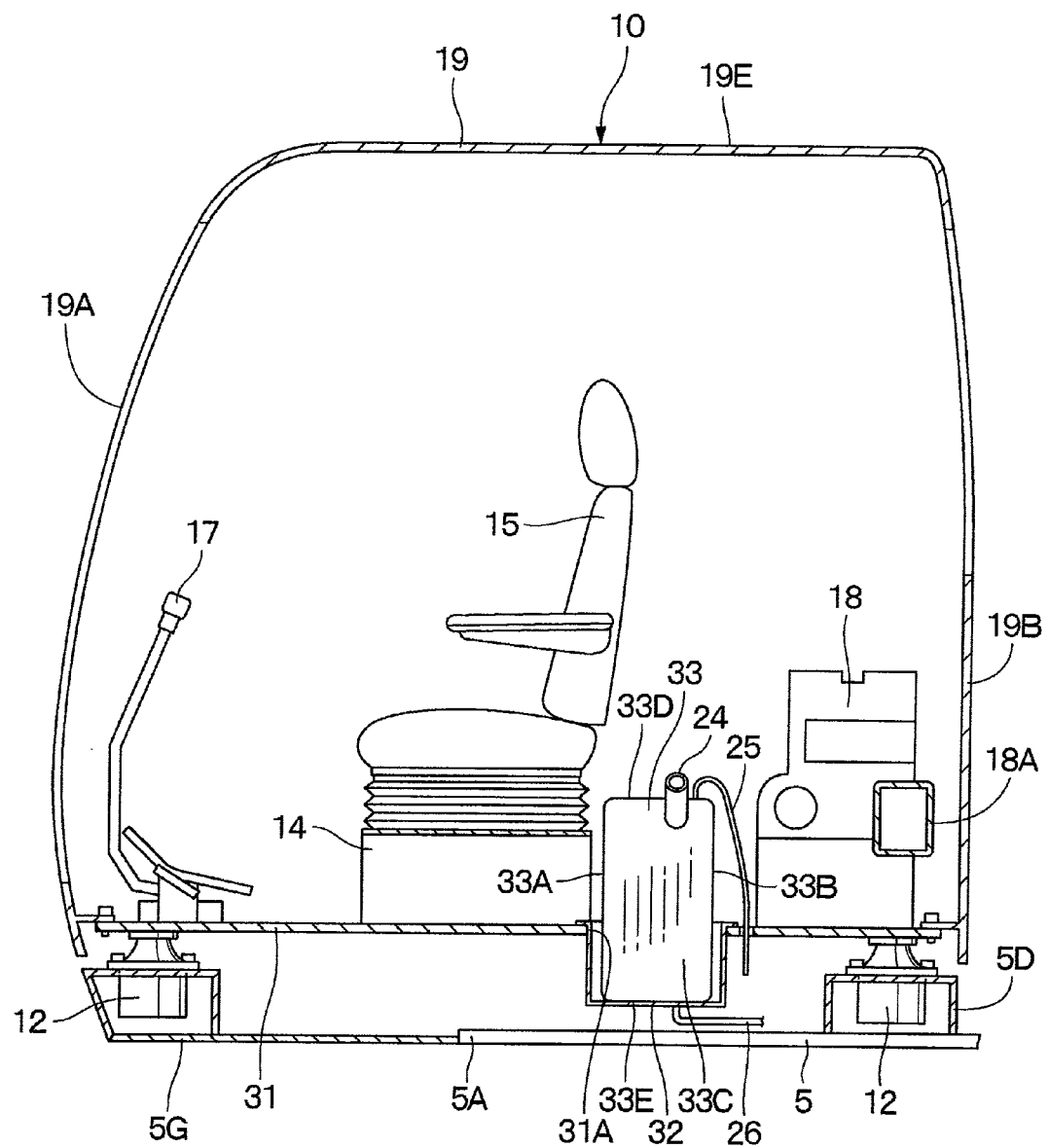
FIG. 9 is a longitudinal sectional view showing an internal structure of a cab provided with a urea water tank according to a second embodiment of the present invention as viewed in the same position as in FIG. 7.

Next, FIG. 9 shows a second embodiment according to the present invention. The present embodiment is characterized in that an indoor unit of an air conditioner for supplying conditioned air is provided on a floor surface of a cab to be positioned in rear side of an operator's seat and a urea water tank is constructed such that at least a part of the container is arranged between the operator's seat and the indoor unit. It should be noted that in the second embodiment, the component elements that are identical to those of the foregoing first embodiment will be simply denoted by the same reference numerals to avoid repetitions of similar explanations.

Indicated at 31 is a floor member as a floor surface according to the second embodiment used instead of the floor member 11 according to the first embodiment. The floor member 31 is formed of a rectangular plate longer in the front and rear directions in the substantially same way as the floor member 11 according to the first embodiment. However, the floor member 31 according to the second embodiment differs from the floor member 11 according to the first embodiment in that an opening portion 31A thereof is formed between the operator's seat 15 and the indoor unit 18 of the air conditioner. Herein, the opening portion 31A of the floor member 31 is formed to be longer in the right and left directions and shorter in the front and rear directions to be positioned in a narrow space between the operator's seat 15 and the indoor unit 18.

Denoted at 32 is a tank accommodating recessed portion according to the second embodiment provided in the opening portion 31A of the floor member 31. The tank accommodating recessed portion 32 is formed in such a manner as to recess a position of the opening portion 31A of the floor member 31 downwards. The tank accommodating recessed portion 32 is formed as a rectangular box which is longer in the right and left directions and shorter in the front and rear directions as compared to the tank accommodating recessed portion 13 according to the first embodiment. Therefore, the urea water tank 33 to be described later can be accommodated in the tank accommodating recessed portion 32 by using the dead space between the operator's seat 15 and the indoor unit 18.

Denoted at 33 is the urea water tank according to the second embodiment provided in the cab 10, and the urea water tank 33 reserves the urea solution in the substantially same way as the urea water tank 23 according to the first embodiment. However, the urea water tank 33 according to the second embodiment differs from the urea water tank 23 according to the first embodiment in that it is arranged between the operator's seat 15 and the indoor unit 18 of the air conditioner.

The urea water tank 33 according to the second embodiment is constituted by a hexahedral casing by a front surface 33A, a rear surface 33B, a left surface 33C, a right surface (not shown), a top surface 33D, and bottom surface 33E and is formed as a vertical liquid-tight container which is shorter in the front and rear directions and longer in the upper and lower directions and right and left directions. Therefore, the vertical urea water tank 33 can secure a large capacity, while it can be accommodated in the narrow space in the front and rear directions between the operator's seat 15 and the indoor unit 18.

Here, for example, the water supply hose 24 is connected to the left surface 33C of the urea water tank 33 at the top portion, and the air open hose 25 is connected to the top surface 33D. Further, the urea water supply pipe 26 is connected to the bottom surface 33E.

In this manner, the second embodiment as thus constructed can also obtain the substantially same operational effect as that of the first embodiment mentioned before. Particularly in the second embodiment, the urea water tank 33 can be arranged by using the narrow space between the operator's seat 15 and the indoor unit 18. Further, the urea water tank 33 can be formed to be longer in the vertical direction to increase the tank capacity.

Figure 10:
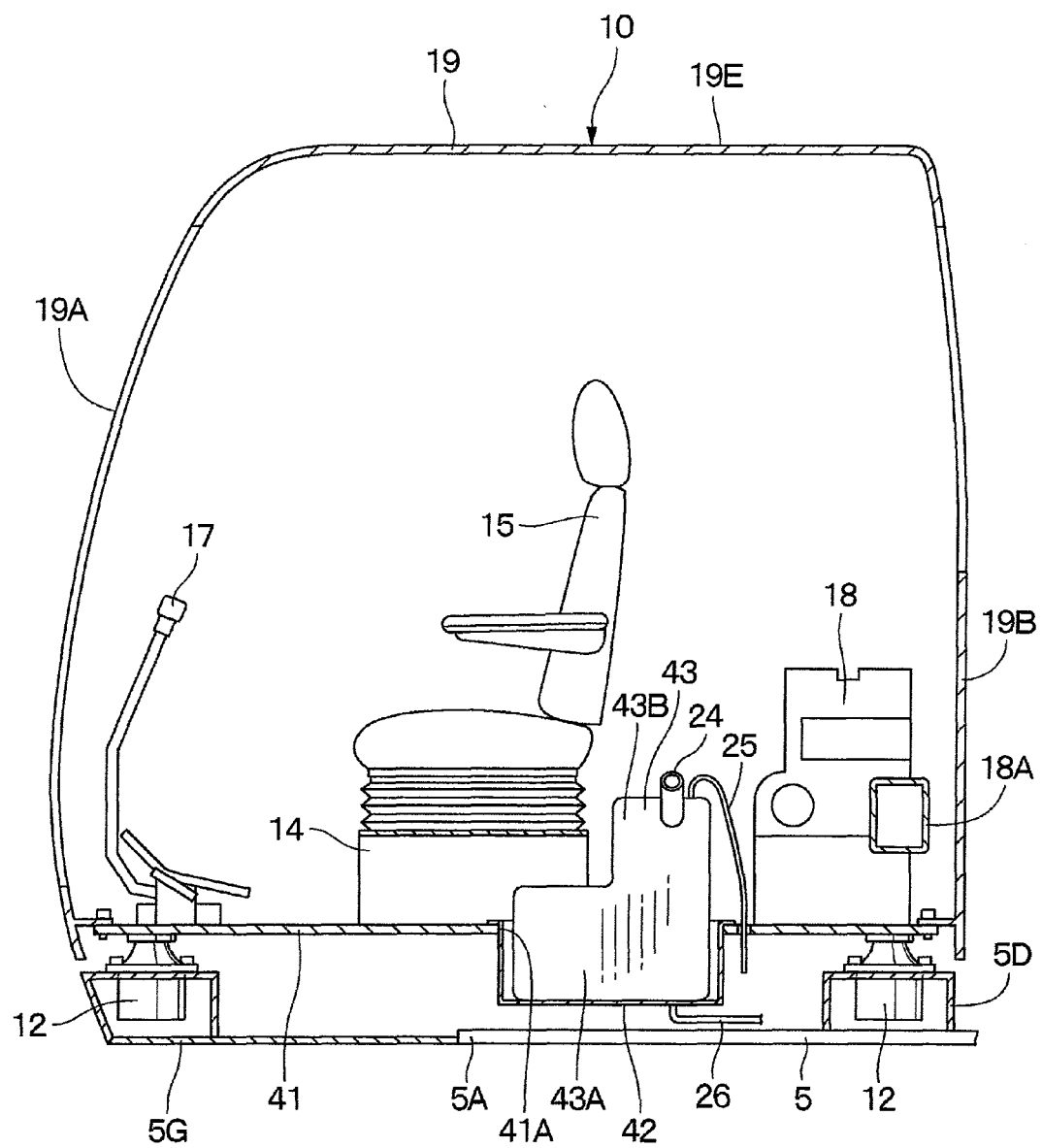
FIG. 10 is a longitudinal sectional view showing an internal structure of a cab provided with a urea water tank according to a third embodiment of the present invention as viewed in the same position as in FIG. 7.

Next, FIG. 10 shows a third embodiment according to the present invention. The present embodiment is characterized in that a urea water tank is formed as a stepped tank including a lower tank portion positioned in the front side and having a low height dimension and a higher tank portion positioned in the rear side and having a high height dimension, wherein the lower tank portion is arranged under an operator's seat and the higher tank portion is arranged in rear of the operator's seat. It should be noted that in the third embodiment, the component elements that are identical to those of the foregoing first embodiment will be simply denoted by the same reference numerals to avoid repetitions of similar explanations.

Indicated at 41 is a floor member as a floor surface according to the third embodiment used instead of the floor member 11 according to the first embodiment. The floor member 41 is formed of a rectangular plate longer in the front and rear directions in the substantially same way as the floor member 11 according to the first embodiment. However, the floor member 41 according to the third embodiment differs from the floor member 11 according to the first embodiment in that an opening portion 41A thereof is formed in a range from the bottom side of the seat support platform 14 (operator's seat 15) to the front side of the indoor unit 18.

Denoted at 42 is a tank accommodating recessed portion according to the third embodiment provided in the opening portion 41A of the floor member 41. The tank accommodating recessed portion 42 is formed in such a manner as to recess downwards a position of the opening portion 41A of the floor member 41, that is, a position from the bottom side of the seat support platform 14 to the front side of the indoor unit 18.

Denoted at 43 is a urea water tank according to the third embodiment provided in the cab 10, and the urea water tank 43 reserves the urea solution in the substantially same way as the urea water tank 23 according to the first embodiment. However, the urea water tank 43 according to the third embodiment differs from the urea water tank 23 according to the first embodiment in the arrangement position and the configuration.

Namely, the urea water tank 43 is provided in a space portion between the rear side portion of the seat support platform 14 and the indoor unit 18 by accommodating the bottom side portion in the tank accommodating recessed portion 42. The urea water tank 43 is formed as a stepped tank including a lower tank portion 43A positioned in the front side and having a low height dimension and a higher tank portion 43B positioned in the rear side and having a high height dimension. The urea water tank 43 of the stepped type is constituted such that the lower tank portion 43A is arranged under the seat support platform 14 (operator's seat 15) and the higher tank portion 43B is arranged between the operator's seat 15 and the indoor unit 18.

In addition, for example, the water supply hose 24 and the air open hose 25 are connected to the upper portion in the higher tank portion 43B of the urea water tank 43, and the urea water supply pipe 26 is connected to the lower portion of the urea water tank 43.

In this manner, the third embodiment as thus constructed can also obtain the substantially same operational effect as that of the first embodiment mentioned before. Particularly in the third embodiment, the urea water tank 43 is formed as the stepped tank including the lower tank portion 43A in the front side and the higher tank portion 43B in the rear side. As a result, the lower tank portion 43A can be arranged under the seat support platform 14 and the higher tank portion 43B can be arranged between the operator's seat 15 and the indoor unit 18. Therefore, the spaces of the lower side of the operator's seat 15, the lower side of the floor member 41, and the rear side of the operator's seat 15 can be efficiently used and the capacity of the urea water tank 43 can be furthermore increased in a limited space.

Figure 11:
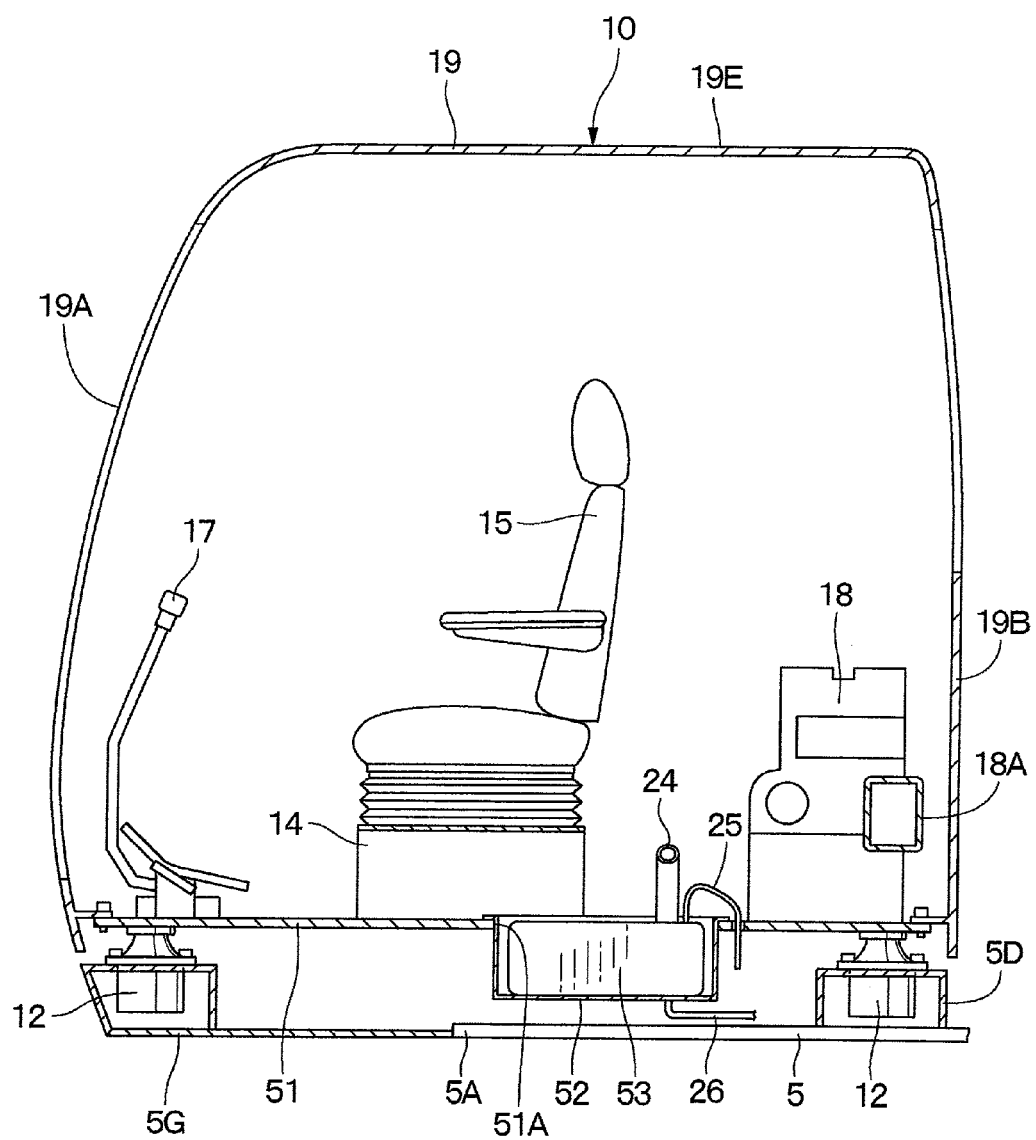
FIG. 11 is a longitudinal sectional view showing an internal structure of a cab provided with a urea water tank according to a fourth embodiment of the present invention as viewed in the same position as in FIG. 7.

Next, FIG. 11 shows a fourth embodiment according to the present invention. The present embodiment is characterized in that an entire urea water tank is arranged in a position lower than a floor surface. It should be noted that in the fourth embodiment, the component elements that are identical to those of the foregoing first embodiment will be simply denoted by the same reference numerals to avoid repetitions of similar explanations.

Indicated at 51 is a floor member as a floor surface according to the fourth embodiment used instead of the floor member 11 according to the first embodiment. The floor member 51 is formed of a rectangular plate longer in the front and rear directions in the substantially same way as the floor member 11 according to the first embodiment. However, the floor member 51 according to the fourth embodiment differs from the floor member 11 according to the first embodiment in that an opening portion 51A thereof is formed in a range from the lower side of the seat support platform 14 (operator's seat 15) to the front side of the indoor unit 18.

Denoted at 52 is a tank accommodating recessed portion according to the fourth embodiment provided in the opening portion 51A of the floor member 51. The tank accommodating recessed portion 52 is formed in such a manner as to recess a position of the opening portion 51A of the floor member 51 downwards.

Denoted at 53 is a urea water tank according to the fourth embodiment provided in the cab 10, and the urea water tank 53 reserves the urea solution in the substantially same way as the urea water tank 23 according to the first embodiment. However, the urea water tank 53 according to the fourth embodiment differs from the urea water tank 23 according to the first embodiment in the arrangement position and the configuration.

Namely, the urea water tank 53 is accommodated in the tank accommodating recessed portion 52 whereby the urea water tank 53 is provided between the rear side portion of the seat support platform 14 and the front side of the indoor unit 18. The urea water tank 53 is formed as a horizontal type liquid-tight container in such a manner as to be flat in a low height dimension. Therefore, the horizontal type urea water tank 53 is constructed such that the entirety is accommodated within the tank accommodating recessed portion 52.

In this manner, the fourth embodiment as thus constructed can also obtain the substantially same operational effect as that of the first embodiment mentioned before. Particularly in the fourth embodiment, the urea water tank 53 is formed as the horizontal type flat liquid-tight container and the entirety thereof is accommodated within the tank accommodating recessed portion 52. As a result, the space can be secured between the operator's seat 15 above the urea water tank 53 and the indoor unit 18 to facilitate the maintenance operation of the indoor unit 18.

It should be noted that the explanation is made on the first embodiment by taking a case where the urea water tank 23 is formed as the hexahedral liquid-tight container by the front surface 23A, the rear surface 23B, the left surface 23C, the right surface 23D, the top surface 23E, and the bottom surface 23F, as an example. However, the present invention is not limited to this particular example, and, for example, the urea water tank may be formed as a multifaceted type container such as a pentahedron type or a heptahedron type. On the other hand, the urea water tank may be formed as other configurations such as a cylindrical shape, a flat spherical shape, and the like. These arrangements may be applied similarly to the other embodiments.

The explanation is made on the first embodiment by taking a case where the floor member 11 is recessed downwards to form the tank accommodating recessed portion 13, and by accommodating the urea water tank 23 in the tank accommodating recessed portion 13, the intermediate portion to the bottom side portion of the urea water tank 23 are arranged in a position lower than the floor member 11. However, the present invention is not limited to this particular example, and, for example, the urea water tank may be provided to be mounted on the top surface of the floor member. This arrangement may be applied similarly to the other embodiments.

The explanation is made on the first embodiment by taking a case where the water supply port 24A of the water supply hose 24 provided in the urea water tank 23 is provided to be opened to the left surface portion 19C of the cab box 19. However, the present invention is not limited to this particular example, and, for example, the water supply port 24A of the water supply hose 24 may be provided to be opened to the other side surface portions 19A, 19B, 19D of the cab box 19. In this case, by extending the water supply hose 24 toward one side surface portion of the other side surface portions 19A, 19B, 19D, the water supply port 24A can be provided on the one side surface portion. This arrangement may be applied similarly to the other embodiments.

Further, each of the embodiments described above exemplifies the crawler type hydraulic excavator 1 as the construction machine. However, the present invention is not limited to this particular example, and may be applied to a wheel type hydraulic excavator. In addition thereto, the present invention may be widely applied to other construction machines such as a wheel loader and a hydraulic crane.

DESCRIPTION OF REFERENCE NUMERALS

1: Hydraulic excavator (construction machine)
2: Lower traveling structure (traveling structure)
3: Upper revolving structure (traveling structure)
5: Revolving frame (support frame)
6: Engine
7: Exhaust pipe
10: Cab
11, 31, 41, 51: Floor member
11A, 31A, 41A, 51A: Opening portion
13, 32, 42, 52: Tank accommodating recessed portion
14: Seat support platform
15: Operator's seat
18: Indoor unit
18A: External air duct
18B: External air filter
19: Cab box
19A: Front surface portion
19B: Rear surface portion
19C: Left surface portion
19D: Right surface portion
19E: Top surface portion
19F: Center pillar
19G: Entrance way
19H: Door
19J: Water supply port opening portion
19K: Opening/closing cover
20: Post-treatment device
22: NOx purifying device
22A: Accommodating tubular casing
22B: Urea selective reduction catalyst
22C: Oxidation catalyst
22D: Urea water injection valve
23, 33, 43, 53: Urea water tank
23A, 33A: Front surface
23B, 33B: Rear surface
23C, 33C: Left surface
23D: Right surface
23E, 33D: Top surface
23F, 33E: Bottom surface
24: Water supply hose
24A: Water supply port
24B: Cap
26: Urea water supply pipe (connecting pipe)
43A: Lower tank portion
43B: Higher tank portion

What is claimed is:

1. A construction machine comprising:
a support frame forming a support structural member for a traveling structure;
an engine mounted at the rear side of said support frame;
a cab, which is positioned at the front side of said support frame and comprises a floor surface, side surface portions in the front and rear directions and in the right and left directions and a top surface portion, and in which an operator's seat on which an operator sits is arranged on said floor surface;
a nitrogen oxide purifying device provided in an exhaust pipe of said engine and equipped with a urea selective reduction catalyst for removing nitrogen oxides in an exhaust gas;
a urea water tank formed of a hollow container for reserving urea water as a reducing agent and including a water supply port for supplying the urea water; and
a connecting pipe connecting said urea water tank and said exhaust pipe of said engine, wherein
said urea water tank is arranged in said cab which provides a temperature environment for preventing freezing and crystallization of the urea water,
a tank accommodating recessed portion is recessed in said floor of said cab below a part of said floor surface downwards between said support frame and said floor surface,
said urea water tank is accommodated in said tank accommodating recessed portion, and
said water supply port is provided to be opened to one side surface portion of said side surface portions of said cab for supplying the urea water to said urea water tank from an outside of said cab.

2. A construction machine according to claim 1,
wherein a water supply hose is provided to be connected to said urea water tank, and
said water supply port is provided in a front end of said water supply hose and is opened to said one side surface portion of said cab.

3. A construction machine according to claim 1,
wherein said water supply port is opened, among said respective side surface portions forming said cab, to an outside surface portion thereof provided with a door opening/closing at the time an operator gets on and off said cab and to the rear side of said door, and
an opening/closing cover for covering said water supply port to be capable of opening/closing is provided in said outside surface portion.

4. A construction machine according to claim 3,
wherein an indoor unit of an air conditioner for supplying conditioned air is provided on said floor surface of said cab,
an external air filter through which said indoor unit takes in external air is provided on said outside surface portion to be positioned in the vicinity to said water supply port, and
said opening/closing cover covers said water supply port and said external air filter together.

5. A construction machine according to claim 1,
wherein an indoor unit of an air conditioner for supplying conditioned air is provided on said floor surface of said cab to be positioned in rear side of said operator's seat, and
said urea water tank arranges at least a part of the container between said operator's seat and said indoor unit.

6. A construction machine according to claim 5,
wherein said tank accommodating recessed portion is provided to be positioned between said operator's seat and said indoor unit, and said urea water tank accommodates at least a part of the container within said tank accommodating recessed portion.

7. A construction machine according to claim 1, wherein said urea water tank is formed as a stepped tank including a lower tank portion positioned in the front side and having a low height dimension and a higher tank portion positioned in the rear side and having a high height dimension, wherein said lower tank portion is arranged under said operator's seat and said higher tank portion is arranged in rear of said operator's seat.

8. A construction machine according to claim 1, wherein said traveling structure comprises an automotive lower traveling structure and an upper revolving structure swingably mounted on said lower traveling structure, and said support frame is a revolving frame of said upper revolving structure.

\* \* \* \* \*